Oct. 6, 1964 T. D. GRAYBEAL 3,151,915
APPARATUS FOR OBTAINING THE SUM OR DIFFERENCE OF THE FREQUENCIES OF TWO ALTERNATING SIGNALS
Filed June 5, 1961 5 Sheets-Sheet 1

INVENTOR.
TROY D. GRAYBEAL
BY
Christie, Parker & Hale
ATTORNEYS.

MODULATION PRODUCTS CONTAINED IN THE OUTPUT OF THE SUMMING NETWORK 30 OF FIG. 1. FOR DIFFERENT NUMBERS OF PHASES (ASSUMING DEMODULATOR ACTION)

| ORDER OF MODULATION PRODUCT | RELATIVE AMPLITUDE | TWO PHASE | | THREE PHASE | | FIVE PHASE | |
|---|---|---|---|---|---|---|---|
| | | UPPER SIDEBAND CHAIN | LOWER SIDEBAND CHAIN | UPPER SIDEBAND CHAIN | LOWER SIDEBAND CHAIN | UPPER SIDEBAND CHAIN | LOWER SIDEBAND CHAIN |
| 1 | 1 | | USEFUL SIGNAL | | USEFUL SIGNAL | | USEFUL SIGNAL |
| 3 | 1/3 | X | | | | | |
| 5 | 1/5 | | X | X | | | |
| 7 | 1/7 | X | | | X | | |
| 9 | 1/9 | | X | | | X | |
| 11 | 1/11 | X | | X | | | X |
| 13 | 1/13 | | X | | X | | |
| 15 | 1/15 | X | | | | | |
| 17 | 1/17 | | X | X | | | |
| 19 | 1/19 | X | | | X | X | |
| 21 | 1/21 | | X | | | | X |
| 23 | 1/23 | X | | X | | | |
| 25 | 1/25 | | X | | X | | |
| 27 | 1/27 | X | | | | | |
| 29 | 1/29 | | X | X | | X | |
| 31 | 1/31 | X | | | X | | |

FIG. 2.

INVENTOR.
TROY D. GRAYBEAL
BY Christie, Parker & Hale
ATTORNEYS.

INVENTOR.
TROY D. GRAYBEAL
BY Christie, Parker & Hale
ATTORNEYS.

INVENTOR.
TROY D. GRAYBEAL
BY Christie, Parker & Hale
ATTORNEYS.

Oct. 6, 1964 T. D. GRAYBEAL 3,151,915

APPARATUS FOR OBTAINING THE SUM OR DIFFERENCE OF THE FREQUENCIES OF TWO ALTERNATING SIGNALS

Filed June 5, 1961 5 Sheets-Sheet 5

INVENTOR.
TROY D. GRAYBEAL
BY Christie, Parker & Hale
ATTORNEYS.

United States Patent Office 3,151,915
Patented Oct. 6, 1964

3,151,915
APPARATUS FOR OBTAINING THE SUM OR DIFFERENCE OF THE FREQUENCIES OF TWO ALTERNATING SIGNALS

Troy D. Graybeal, Anaheim, Calif., assignor to Lear Siegler, Inc., a corporation of Delaware
Filed June 5, 1961, Ser. No. 114,943
10 Claims. (Cl. 307—3)

The present invention relates to frequency converter apparatus for obtaining the sum or difference of the frequencies of two alternating current signals.

Apparatus for obtaining the sum or difference between the frequencies of two alternating current signals such as modulators or demodulators are utilized in many applications. A phase sensitive modulator or demodulator per se will generally provide an output signal which includes both the sum and difference of the input frequencies. The unwanted signal or undesired sideband is generally eliminated by means of an appropriate wave filter. The output signals from such prior art modulators and demodulators also include additional modulation products in the form of harmonics which are also eliminated by suitable filtering techniques. In many applications the inherent phase shift of the desired signal by the wave filter (inserted in the output of a modulator or demodulator) is undesirable.

Phase shifting techniques have been employed in the past in single sideband communication systems to cancel the undesired upper or lower sideband in a two phase modulator or demodulator circuit. See, for example, an article by D. E. Norgaard in the Proceedings of the Institute of Radio Engineers, December, 1956, Volume 44 No. 12, page 1718 entitled "The Phase-Shift Method of Single-Sideband Signal Generation." While such a prior art two phase demodulator circuit removes the upper sideband and thereby appreciably decreases the filter requirements, it does not remove the third or higher order modulation products except one of each mating pair in the upper or lower sideband chains as will be discussed more fully. In many control systems the removal of the upper (or lower) sideband alone is insufficient to insure satisfactory control characteristics because of the phase shift imposed on the desired signal by the action of the filter which provides sufficient attenuation for the third and higher order harmonic modulation products. This is particularly true in control apparatus for A.C. excited induction machines of the type disclosed in the copending application of Troy D. Graybeal, entitled "Control Apparatus for Alternating Current Dynamoelectric Machines," Serial No. 91,925, filed February 27, 1961, and assigned to the assignee of the present invention.

The above disadvantages of prior art modulator and demodulator circuits are overcome by the present invention which eliminates not only the undesired sideband but at least the third harmonic as well as other higher order modulation products from the output signal. As a result, the remaining undesired modulation products can be readily filtered without causing any appreciable phase shift in the main or desired signal. In accordance with the present invention an apparatus is provided for obtaining the sum or difference of the frequencies of the two polyphase signals having the same number of phases which is greater than two. The apparatus includes a frequency comparator associated with each phase of the signals. Each of the frequency comparators includes a pair of inputs and an output and is arranged to provide an output signal which includes the sum and difference of the frequencies of the input signals thereto. One of the inputs of each of the frequency comparators is adapted to be connected to the respective phase of one of the signals and the other input of each of the frequency comparators is adapted to be connected to the respective phase of the other signal. Means are further provided for obtaining the sum of the output signals from each of the frequency comparators to eliminate the third and other higher order modulation products.

The invention is described in more detail in reference to the accompanying drawings in which:

FIG. 2 is a chart showing the modulation products which are removed by the apparatus of FIG. 1 for different numbers of phases;

Figure 1:
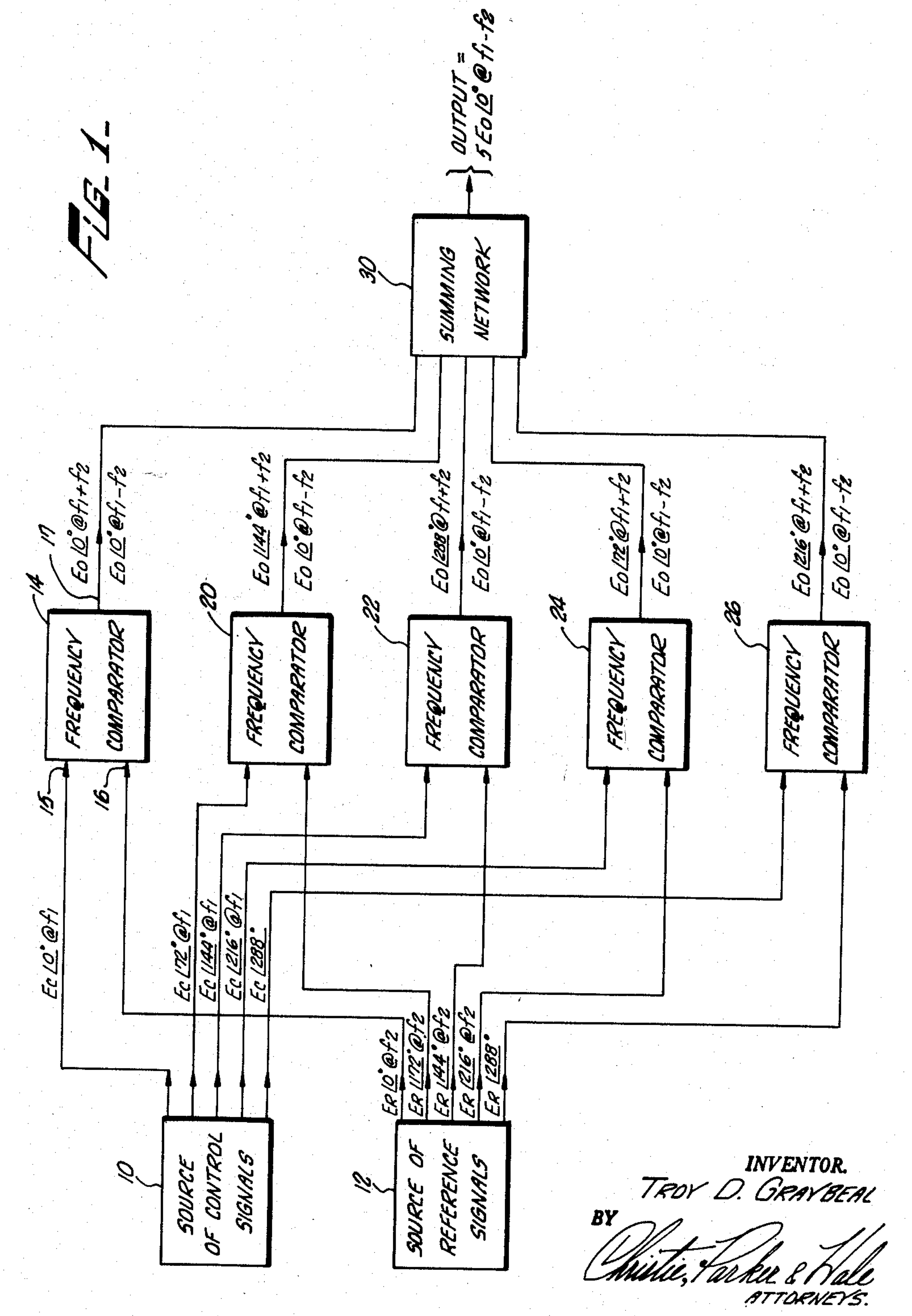
FIG. 1 is a block diagram of an apparatus in accordance with the present invention.

Referring now to the drawings and more particularly to FIG. 1, a source of control signals 10 is provided for producing polyphase control signals having M phases. In the embodiment shown in FIG. 1 the control signals have five phases so that M=5. A source of reference signals 12 is also provided for producing polyphase reference signals having the same number of phases (five) as the control signals from the source 10. The five phases of the control signals are designated in FIG. 1 by $E_c\angle 0°$, $E_c\angle 72°$, $E_c\angle 144°$, $E_c\angle 216°$ and $E_c\angle 288°$ where: $E_c\angle 0°$ represents a signal having a magnitude $E_c$ at a phase angle of 0° and $E_c\angle 72°$ represents a signal having a magnitude $E_c$ at a phase angle of 72°. The magnitude of the reference signals is represented by $E_r$ and the angles for the various phases are illustrated in the figure. Each of the sources 10 and 12 preferably provide balanced polyphase signals. The frequency of the control signals is designated $f_1$ and the frequency of the reference signals is designated $f_2$.

Figure 3:
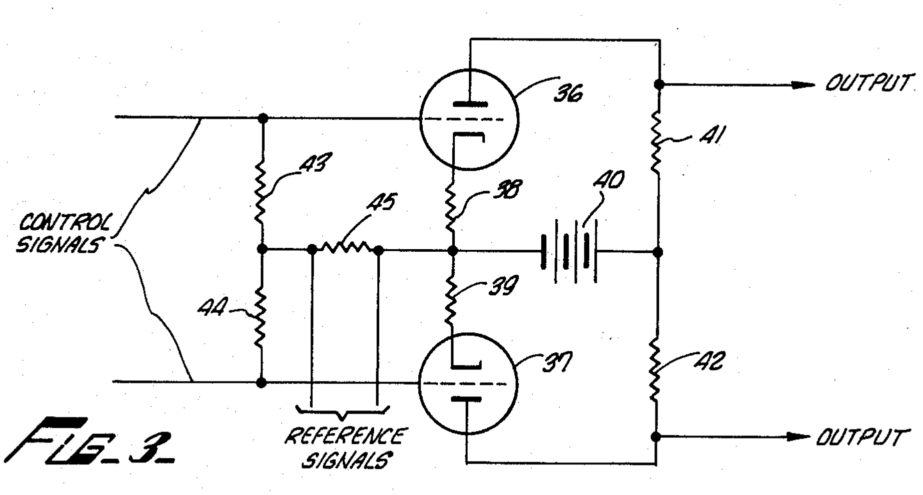
FIG. 3 is a schematic circuit diagram of one type of frequency comparator that may be employed in the apparatus of FIG. 1.
Figure 4:
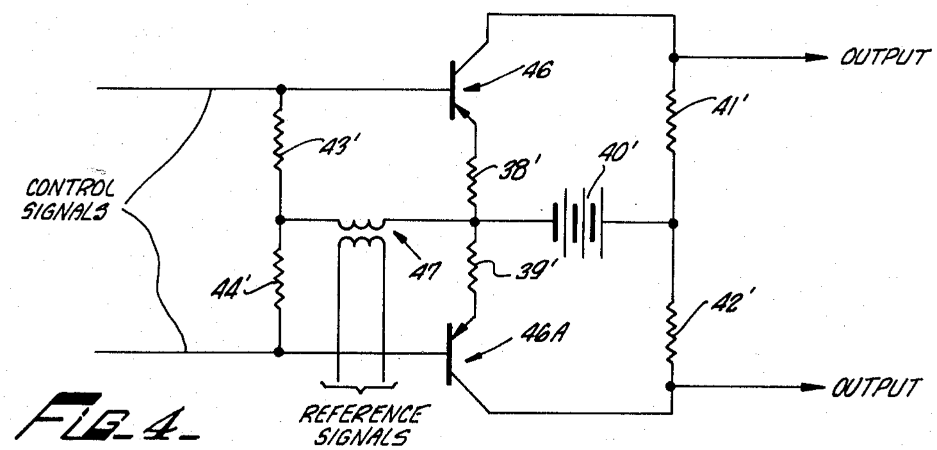
FIG. 4 is a schematic circuit diagram of another type of frequency comparator that may be employed in the apparatus of FIG. 1.
Figure 5:
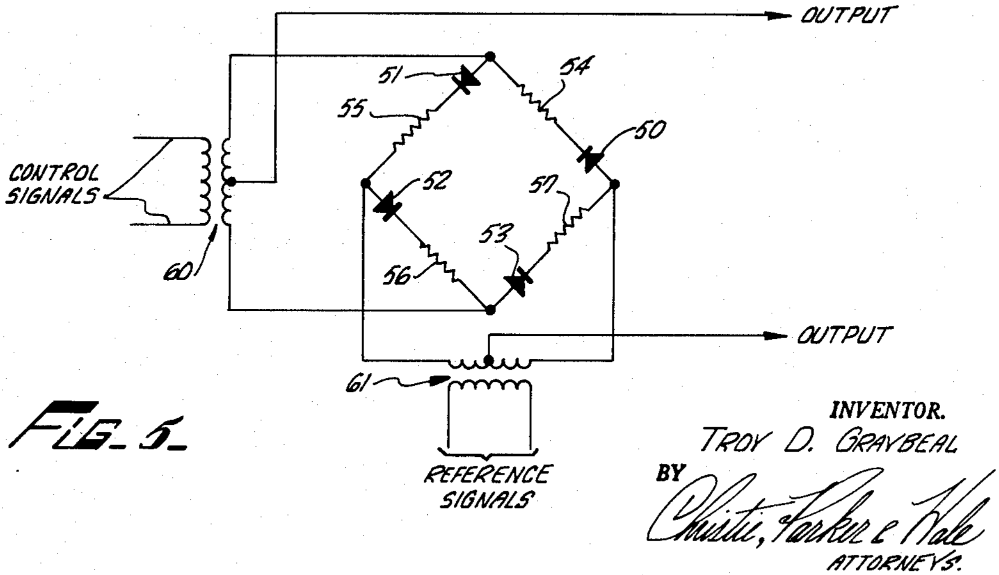
FIG. 5 is a schematic circuit diagram of an additional type of frequency comparator that may be employed in the apparatus of FIG. 1.

A frequency comparator having a pair of input circuits and an output circuit is associated with each phase of the control or reference signals. A frequency comparator 14 having a first input circuit 15, a second input circuit 16 and an output circuit 17 is provided for the first phase of the control and reference signals ($E_c\angle 0°$, $E_r\angle 0°$) as is shown. The first input circuit 15 of the frequency comparator 14 is connected to the source of control signals to receive the control signal $E_c\angle 0°$ and the second input circuit 16 is connected to the source 12 to receive the reference signal $E_r\angle 0°$. The frequency comparator 14 may be a conventional phase sensitive modulator or demodulator as shown in FIGS. 3, 4 and 5 which will be described in more detail. The frequency comparator 14 produces an output signal which includes the sum and difference of the frequencies of the input signals thereto and certain harmonic modulation products as is well known in the art. The sum and difference signals in the output of the frequency comparator 14 are noted in FIG. 1 as $E_o\angle 0°$ @ $f_1+f_2$ and $E_o\angle 0°$ @ $f_1-f_2$ where: $E_o$ represents the magnitude of the output signal, the $\angle 0°$ represents the phase angle of the signal and $f_1+f_2$ and $f_1-f_2$ represents the sum and difference frequency, respectively.

Frequency comparators 20, 22, 24, 26 similar to the frequency comparator 14 are connected to respective phases of the control and reference signals as shown. A summing network 30 is connected to the output circuits of each of the frequency comparators 14, 20, 22, 24, 26 to provide a combined output signal which is illustrated as being equal to $5E_0\angle 0°$ at the difference frequency $f_1-f_2$. In the summing network 30 the upper sidebands or the signals having the sum frequency, $f_1+f_2$, are cancelled out due to the phase shift between the separate upper sideband output signals from the frequency comparators as is illustrated in FIG. 1. As shown in FIG. 2 the output signal from the summing network 30 for a five phase source of control and reference signals includes only the ninth, eleventh, nineteenth, twenty-first, twenty-ninth, thirty-first, etc. modulation products which have an amplitude as illustrated in column 2 of FIG. 2. These modulation products have a frequency far removed from the desired (lower sideband) signal and have an amplitude many times smaller. Thus these higher order modulation products are readily removed by conventional filter techniques with a very small phase shift of the desired (lower sideband) signal. For example, the lowest order modulation product is the seventh harmonic which has a frequency equal to $7f_1+f_2$ and an amplitude equal to 1/7 of the amplitude of the desired lower sideband signal $5E_0\angle 0°$ @ $f_1-f_2$.

The apparatus of FIG. 1 may be employed with any desired number of phases of the control and reference signals providing that the number of phases is equal to three or greater. A separate frequency comparator must be provided for each phase of the control and reference signals. For example, in a three phase system, three frequency comparators are employed for each desired output phase as will be described in connection with FIGS. 6 and 7. In a seven phase system, the control and reference signals must be seven phase and seven separate frequency comparators must be employed for each desired output phase. The output of the apparatus of FIG. 1 is single phase. However, additional phases of output signals may be derived in the same manner as the single phase shown in the apparatus of FIG. 1 but with the control and reference signals displaced by an integral number of phases in the same direction (corresponding to the number of phases of concern) as is described in more detail in connection with the apparatus of FIG. 6. As shown in FIG. 2 at least three phases of the control and reference signals are necessary to eliminate the third harmonic modulation product.

Referring now to FIG. 3 there is illustrated a conventional balanced modulator circuit employing vacuum tube triodes 36 and 37 with their cathodes connected together through cathode resistors 38 and 39 to the negative terminal of a battery or B+ supply 40. The positive terminal of the battery 40 is connected through plate resistors 41 and 42 to the plates of the triodes 36 and 37 as shown. The control signals are applied to the grids of the triodes 36 and 37 which are connected together through voltage divider resistors 43 and 44. The reference signals are applied to an input resistor 45 which is connected between the negative terminal of the battery 40 and the junction of the resistors 43 and 44. The output circuit is taken across resistors 41 and 42.

The balanced modulator circuit of FIG. 4 is similar to the circuit of FIG. 3 and like elements are referred to by prime reference numerals. In the apparatus of FIG. 4 transistors 46 and 46A (which may be of the PNP junction type) are employed as the active elements instead of the triodes 36 and 37 of FIG. 3. The reference signals are applied by means of a transformer 47 instead of the resistor 45 of FIG. 2.

A rectifier type phase sensitive modulator circuit is shown in FIG. 5 in which rectifiers 50–53 are connected in a bridge arrangement with resistors 54–57 as shown. The control signals are applied across two arms of the bridge by a transformer 60. The reference signals are applied across opposite arms of the bridge by a transformer 61. The output is taken across the center taps of secondary windings of the transformers 60 and 61 as shown.

Figure 6:
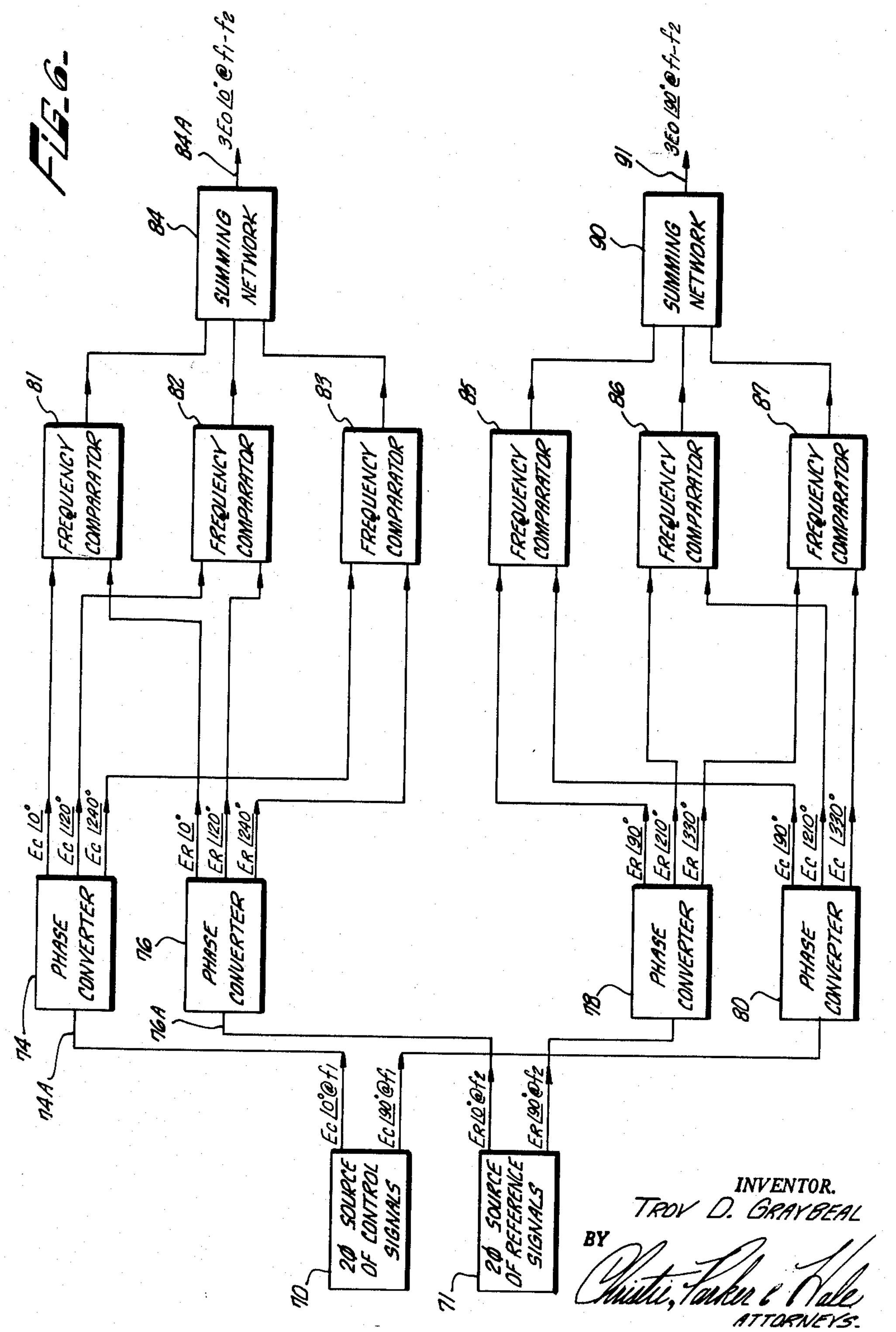
FIG. 6 is a block diagram of another embodiment of the present invention.

Referring now to FIG. 6 there is illustrated an apparatus for providing a two phase output signal having a frequency equal to the sum or difference of the frequencies of the control and reference signals. A two phase source of control signals 70 and a two phase source of reference signals 71 are connected to phase converters 74, 76, 78 and 80 to provide a three phase control and reference signal for each output phase as will be more clearly described. The first output phase of the control signals $E_c\angle 0°$ is connected to the input 74A of the phase converter 74. The phase converter 74 may be a suitable phase shifting network or other type of electronic or electro-mechanical device for producing a three phase output in the form of $E_c\angle 0°$, $E_c\angle 120°$, $E_c\angle 240°$. The first phase of the reference signals $E_r\angle 0°$ is connected to the input 76A of the phase converter 76 which produces a three phase output signal in the form of $E_r\angle 0°$, $E_r\angle 120°$, $E_r\angle 240°$. A frequency comparator is associated with each output phase of the phase converters 74, 76. For example, frequency comparators 81, 82, 83, are each provided with a pair of input circuits and an output circuit. The frequency comparators may be similar to those illustrated in FIGS. 3, 4 and 5. One input circuit of the frequency comparators 81, 82, 83 is connected to a separate output phase of the phase converter 74 and the other input circuit of the frequency comparators 81, 82 and 83 is connected to a separate output phase of the phase converter 76 as shown. A summing network 84 is connected to the output circuits of each of the frequency comparators 81, 82 and 83 for adding the outputs thereof to provide an output signal across the output circuit 84A represented by $3E_0\angle 0°$ @ $f_1-f_2$ where: $f_1$ represents the frequency of the control signals and $f_2$ represents the frequency of the reference signals.

The second output phases of the control and reference signals (e.g. $E_c\angle 90°$ and $E_r\angle 90°$) are connected to the inputs of phase converters 80 and 78, respectively. A separate phase of the output signals from the phase converters 80 and 78 are connected to the input circuits of three frequency comparators 85, 86 and 87 as shown. A summing network 90 is connected across the output circuits of the frequency comparators 85, 86, 87 to obtain a sum of the output signals therefrom and provides an output signal across an output circuit 91 which is represented by $3E_0\angle 90°$ @ $f_1-f_2$. Thus the output signals from the summing networks 84 and 90 have a frequency equal to the difference in frequencies of the control and reference signals and are phase displaced by 90°. The apparatus of FIG. 6 employs three phase control and reference signals for each output phase and eliminates the third as well as additional higher order harmonics from the output signals as is shown in FIG. 2.

Figure 7:
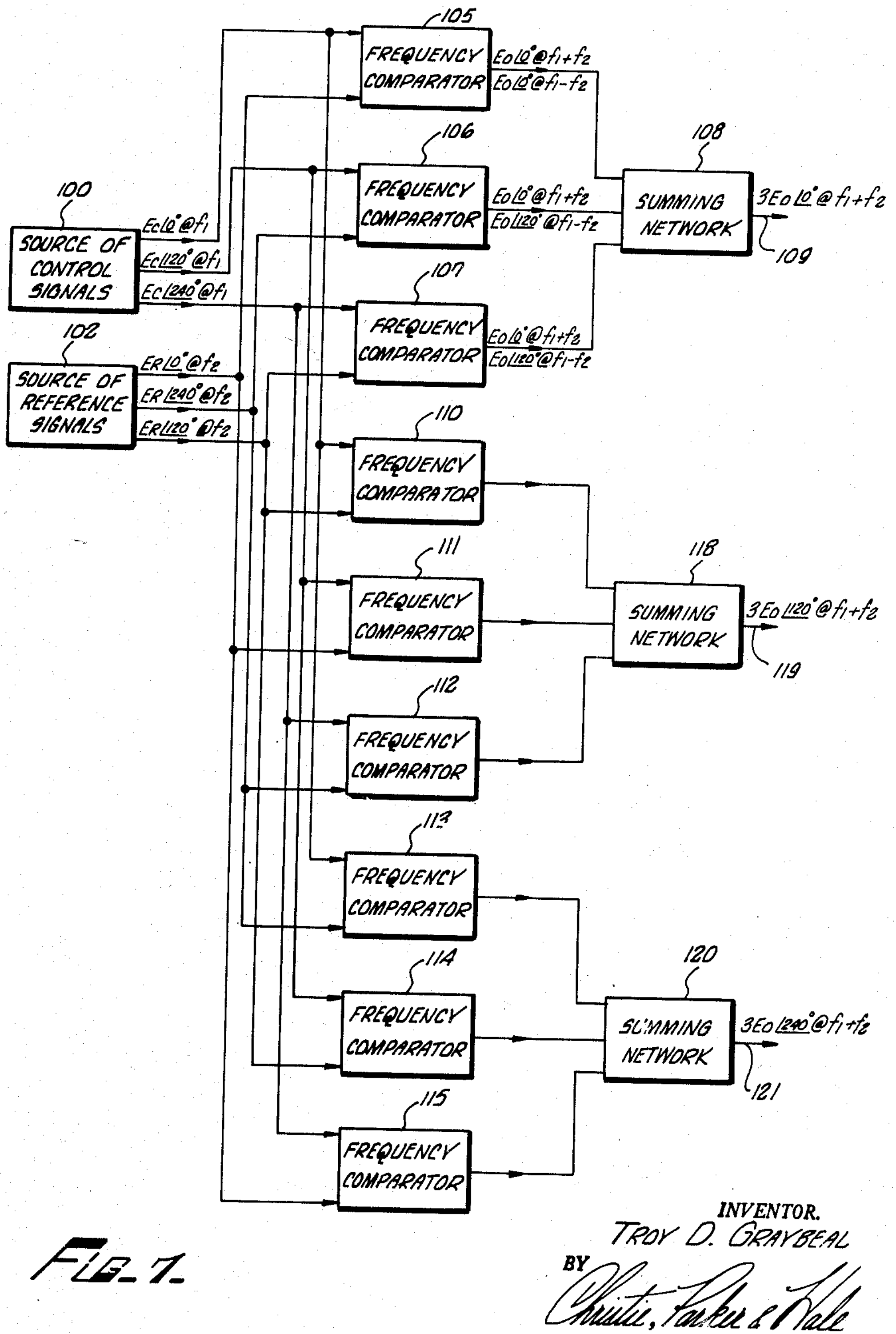
FIG. 7 is a block diagram of an additional embodiment of the present invention.

The apparatus illustrated in FIG. 7 is similar to the apparatus of FIG. 6 except that a three phase output signal instead of a two phase output signal is desired. Thus nine separate frequency comparators and three separate summing networks are employed. A source of three phase control signals 100 is provided for producing a three phase control signal, $E_c 0°$, $E_c\angle 120°$, $E_c\angle 240°$ at a frequency of $f_1$. A three phase source of reference signals 102 is also provided for producing a three phase reference signal $E_r\angle 0°$, $E_r\angle 120°$, $E_r\angle 240°$ at a frequency of $f_2$. Three frequency comparators 105, 106 and 107 are provided for the first output phase of the frequency changes apparatus of FIG. 7. The frequency comparators of FIG. 7 may be similar or identical to those illustrated in FIGS. 3, 4 and 5. One input circuit of each of the frequency comparators 105, 106, 107 is connected to a separate output phase of the source of control signals 100 as shown. The other input circuit of the frequency comparators 105, 106, 107 is connected to a separate output phase of the source of control signals 102 as shown. A summing network 108 having an output circuit 109 is connected to the output circuits of the frequency comparators 105, 106, 107 to derive the algebraic sum of the output signals from the frequency comparators. The summing network provides an output signal across the output circuit 109 thereof which is represented by $3E_o\angle 0°$, at a frequency of $f_1+f_2$ or the sum frequency of the control and reference signals. As will be noted, the phase sequence of the reference signals has been reversed (as compared with the apparatus of FIG. 6) which results in modulator action of the apparatus of FIG. 7 to provide an output signal having the sum instead of difference frequency. It should be noted that it is only necessary to reverse the phase sequence of either the control or reference signals to change the action of the apparatus of this invention from a demodulator to modulator operation or vice versa. Frequency comparators 110–115 are connected to the source of control and reference signals as illustrated to provide the other two output phases. A summing network 118 having an output 119 is connected across the output circuits of frequency comparators 110, 111, 112 and a summing network 120 having an output circuit 121 is connected across the output circuits of the frequency comparators 113, 114 and 115 to provide two additional output phases. For example the output from the summing network 118 is represented by $3E_o\angle 120°$ having a frequency $f_1+f_2$.

Various modifications of the apparatus of the present invention will be readily apparent to those skilled in the art. For example, many well known types of modulators and demoluators may be employed as the frequency comparators. The polyphase source of control and reference signals may include suitable phase shifting networks or phase converters to suitably shift a single or two phase signal to the desired number of operating phases. It is necessary however that the number of operating phases be at least three to eliminate the third harmonic modulation products which permits the use of a relatively simple and inexpensive wave filter in the output of the frequency converter apparatus with a resulting negligible phase shift in the desired output signal.

What is claimed is:

1. In an apparatus for obtaining the sum of difference of the frequencies of two signals the combination which comprises a first source of alternating current signals having M phases wherein M is an integer greater than two, a second source of alternating current signals having M phases, a frequency comparator associated with each of the M phases, each of the frequency comparators having a pair of inputs and an output and being arranged to provide an output signal which includes the sum and difference of the frequencies of the input signals, means for connecting one of the inputs of each of frequency comparators to the respective phase of the first source, means for connecting the other input of each of the frequency comparators to the respective phase of the second source and means for obtaining the sum of the outputs from each of the frequency comparators.

2. The combination as defined in claim 1 wherein M is an odd integer greater than two.

3. The combination as defined in claim 1 wherein M is equal to three.

4. The combination as defined in claim 1 wherein M is equal to five.

5. In an apparatus for obtaining the sum or difference of the frequencies of alternating current signals the combination which comprises a source of balanced polyphase control signals, a source of balanced polyphase reference signals, each of the control and reference signals having the same number of phases which is greater than two, a frequency comparator associated with each of the phases, each of the frequency comparators having a pair of inputs and an output and being arranged to provide an output signal that is equal in frequency to the sum and difference of the frequency of the input signals thereto, means for connecting one of the inputs of each of the frequency comparators to the respective phase of the source of control signals, means for connecting the other input of each of the frequency comparators to the respective phase of the source of reference signals and means for obtaining the sum of the outputs from each of the frequency comparators to provide a single phase output signal.

6. In an apparatus for obtaining the sum or difference of the frequencies of two polyphase signals having the same number of phases which is greater than two, the combination which comprises a frequency comparator associated with each phase, each of the frequency comparators having a pair of inputs and an output and being arranged to provide an output signal across the output thereof which includes the sum and difference of the frequencies of the input signals thereto and harmonic modulation productions, means for connecting one of the inputs of each of the frequency comparators to the respective phase of one of the signals, means for connecting the other input of each of the frequency comparators to the respective phase of the other signal and means for obtaining a sum of the outputs from each of the frequency comparators.

7. The combination as defined in claim 6 wherein each of the two signals in three phase and wherein each of the frequency comparators is an electronic phase sensitive modulator.

8. In an apparatus for obtaining the sum or difference of the frequencies of a two phase control signal and a two phase reference signal the combination which comprises a first, second, third and fourth phase converter, each of the phase converters having a single phase input and a three phase output the input of the first phase converter being adapted to be connected to one phase of the control signal, the input of the second phase converter being adapted to be connected to one phase of the reference signal, the input of the third phase converter being adapted to be connected to the other phase of the control signal, the input of the fourth phase converter being adapted to be connected to the other phase of the reference signal, first, second, third, fourth, fifth and sixth frequency comparators, each of the frequency comparators having input and output and being arranged to provide an output signal including the sum and difference of the frequencies of the input signals thereto, means for connecting one input of the first, second and third frequency comparators to a separate output phase of the first phase converter, means for connecting the other input of the first, second and third frequency comparators to a separate output phase of the second phase converter, a first summing network connected to the outputs of the first, second and third frequency comparators, means for connecting one input of the fourth, fifth and sixth frequency comparators to a separate output phase of the third phase converter, means for connecting the other input of the fourth, fifth and sixth frequency comparators to a separate output phase of the fourth phase converter and a second summing network connected to the outputs of the fourth, fifth and sixth frequency comparators.

9. In an apparatus for obtaining the sum or difference of the frequencies of a three phase control signal and a three phase reference signal the combination which comprises first, second, third, fourth, fifth, sixth, seventh, eighth and ninth frequency comparators, each of the frequency comparators having a pair of inputs and an output and arranged to provide an output signal which includes the sum and difference of the frequencies of the input signals thereto, one input of the first, fourth and seventh frequency comparators being adapted to be connected to a first phase of the control signals, one input of the second, fifth and eighth frequency comparators being adapted to be connected to a second phase of the control signals, one input of the third, sixth and ninth frequency comparators being adapted to be connected to a third phase of the control signals, the other input of the first, fifth and ninth frequency comparators being adapted to be connected to a first phase of the reference signals, the other input of the second, sixth and seventh frequency comparators being adapted to be connected to a second phase of the reference signals, the other input of the third, fourth and eighth frequency comparators being adapted to be connected to a third phase of the reference signals, a first summing circuit connected to the output of the first, second and third frequency comparators for obtaining the algebraic sum of the signals produced by the first, second and third frequency comparators, a second summing network connected to the output of the fourth, fifth and sixth frequency comparators for obtaining the algebraic sum of the signals produced by the fourth, fifth and sixth frequency comparators and a third summing network connected to the output of the seventh, eighth and ninth frequency comparators for obtaining the algebraic sum of the output signals produced by the seventh, eighth and ninth frequency comparators.

10. The combination as defined in claim 9 wherein each of the frequency comparators is an electronic phase sensitive demodulator.

References Cited in the file of this patent

UNITED STATES PATENTS 2,817,775 Rosenberg et al. -------- Dec. 24, 1957

UNITED STATES PATENT OFFICE

CERTIFICATE OF CORRECTION

Patent No. 3,151,915 October 6, 1964

Troy D. Graybeal

It is hereby certified that error appears in the above numbered patent requiring correction and that the said Letters Patent should read as corrected below.

Column 4, line 68, for "changes" read -- changer --; column 6, line 27, for "in" read -- is --.

Signed and sealed this 23rd day of March 1965.

(SEAL)
Attest:

ERNEST W. SWIDER
Attesting Officer

EDWARD J. BRENNER
Commissioner of Patents